J. M. STANYAN.
Dough Mixer.

No. 201,460.   Patented March 19, 1878.

Witnesses
Charles E. Stone
Christopher Sears

Inventor.
John M. Stanyan

UNITED STATES PATENT OFFICE.

JOHN M. STANYAN, OF MILFORD, NEW HAMPSHIRE.

IMPROVEMENT IN DOUGH-MIXERS.

Specification forming part of Letters Patent No. 201,460, dated March 19, 1878; application filed November 26, 1877.

*To all whom it may concern:*

Be it known that I, JOHN M. STANYAN, of Milford, in the county of Hillsborough and State of New Hampshire, have invented a new and useful Dough-Mixer, which is fully set forth and described and shown in the following specification and accompanying drawings, in which—

Figure 1:
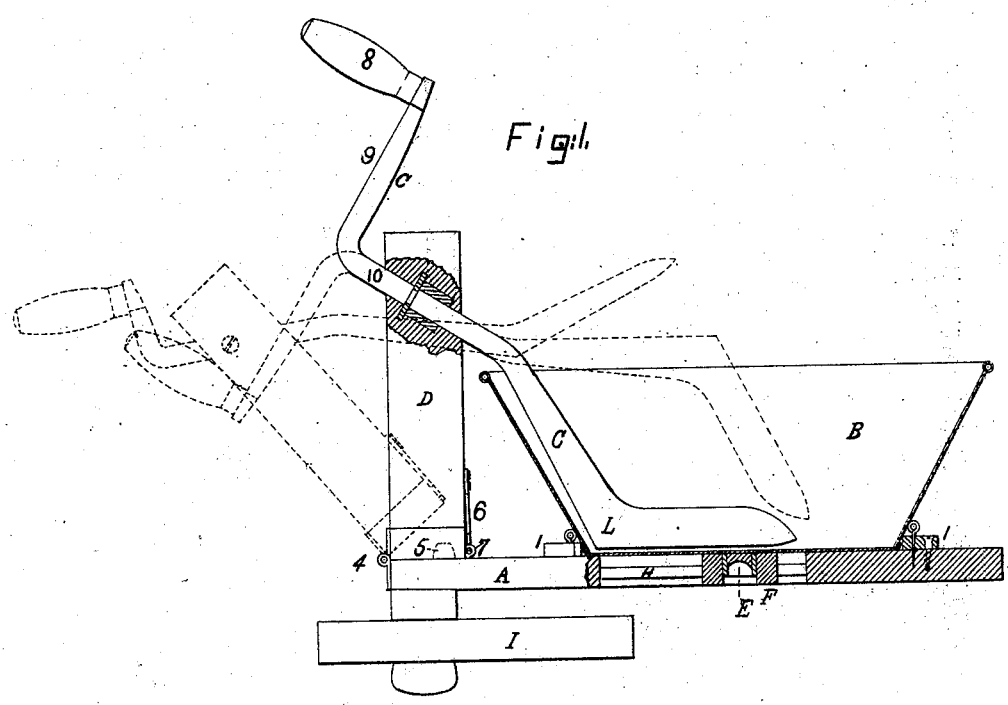
Figure 2:
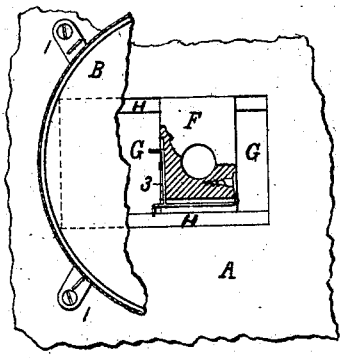

Figure 1 is a vertical sectional view of the dough-mixer; and Fig. 2 is a top view of a portion of the platform, showing the fastening-buttons abutting against the bottom of the pan broken away to show a horizontal section of the bridge on which, in one arrangement, the pan turns.

The object of this invention is to furnish a mechanical device simple in construction and easy to be cleaned, by which dough may be mixed, kneaded, and cut thoroughly, and with less labor than by hand, and without contact between the hands and the dough.

This device, it is apprehended, will also be found useful for mixing and beating up other things.

It consists of a stirrer, revolving in a pan, and of such peculiar shape as to do the work and turn the pan at the same time, and in certain novelties in the details.

In the drawings, A is the platform, B is the pan, and C is the stirrer, mounted in the post D. The platform A may be a plain board when an ordinary bread-pan is used, in which case the pan is confined on it, so as to revolve freely between buttons 1 1, preferably four in number, at equal intervals, which are pivoted on the platform, and are turned so as to adjust them to pans of different sizes, and abut against the side of the pan, and are fastened in their adjusted positions by screw-eyes passing down through them into the platform. I have also provided the pan with a pivot, E, on its bottom, to turn in a hole in the platform; and to admit of pans of different sizes, I place this hole in a bridge, F, across an aperture, G, in the platform, which slides lengthwise of the platform, toward and away from the post, on ways H. A spring-catch, 3, Fig. 2, on the bridge, playing into or against the way H, will hold the bridge in the position to which it is adjusted. With this arrangement the buttons 1 1 may be discarded.

An ordinary clamp, I, turning on a wood pin, serves to fasten the platform to the table on which it is used.

The post D is hinged to the platform at 4, so as to be tipped, as shown in dotted lines, as far as necessary to permit the pan to be put in place or removed without tipping it. It is held in perpendicular position by one or more studs, 5, projecting up from the platform into the lower end of the post, or into a brace on the lower end of the post extending across the platform, and a hook, 6, pivoted on its front face, hooking into an eye, 7, projecting up from the platform. This platform may be dispensed with by attaching the other parts, above described, directly to the ordinary table.

The stirrer C is made of wood or metal, and of sufficient stiffness, and turns in a hole in the upper end of the post D, and projects downward, so that its blade L may revolve in the pan, and it has a handle, 8, upon a crank, 9, projecting at right angles from the shank 10. The shank has a round bearing, and is held in position in the post by a washer projecting from the sides of the hole in the post, and fitting in a groove cut around the shank 10. The blade of the stirrer L conforms, at its outer edge, to the pan; and the shank, prolonged, would strike the bottom at or beyond its center, so that the blade, in revolving, in the course of one revolution of the pan, will sweep close to its whole interior surface, and at the same time the point of the blade will revolve near the bottom of the pan, and avoid throwing the materials out.

To mix bread in the best manner with this device, it is requisite to cover the bottom of the pan with the water or milk with which it is mixed before the flour is put in, and then to pour as much more as is necessary to moisten the flour down the sides of the pan as the mixing goes on. This prevents the adhering of dry flour not reached by the blade to the bottom and side of the pan. The blade is turned by the hand on the crank-handle as fast as experience dictates. As the fluid is poured in and the hand turns the stirrer, the blade will revolve through the materials, assuming as its uppermost position that shown in dotted lines, Fig. 1. The stirrer, in each revolution, not only mixes the materials, but also, by the resistance offered by them, turns the pan a little, which brings a new portion of the materials into its path, and so on until the pan is revolved as many times as necessary to mix the whole mass evenly and thoroughly, and cut it and knead it.

It is desirable to set the dough to rise in the same pan in which it is mixed, and after it has risen to replace the pan under the stirrer and pass the blade through it a few times. Dough can be prepared for the oven, as above described, in less time than is possible by hand, and with much less labor, and with obvious advantages in cleanliness.

What I claim as my invention is—

1. A dough mixing and kneading blade having its lower portion conforming to the interior of the pan, and its upper portion projecting obliquely upward from the lower, so as to revolve in an inclined bearing in a standard arising from the pan-supporter, substantially as shown and described.

2. In a dough mixing and kneading machine, a pan supported upon a horizontal support, and a mixing and kneading blade, resting in an inclined bearing in an upwardly-projecting standard, and by its revolution causing the turning of the pan on a vertical axis, substantially as shown and described.

3. The combination of the revolving stirrer C, hinged post D, and pan B, as and for the purposes above described.

4. The combination of the pivoted pan and sliding bridge F, as and for the purposes above described.

JOHN M. STANYAN.

Witnesses:
CHARLES E. STONE,
CHRISTOPHER SEARS.